United States Patent [19]
Pringle

[11] Patent Number: 5,316,094
[45] Date of Patent: May 31, 1994

[54] WELL ORIENTING TOOL AND/OR THRUSTER

[75] Inventor: Ronald E. Pringle, Houston, Tex.

[73] Assignee: Camco International Inc., Houston, Tex.

[21] Appl. No.: 963,864

[22] Filed: Oct. 20, 1992

[51] Int. Cl.[5] .......................... E21B 4/18; E21B 7/08
[52] U.S. Cl. ........................................ 175/74; 175/99;
175/230; 175/321; 175/322
[58] Field of Search ............... 175/99, 230, 322, 73,
175/74, 321; 166/72, 117.7

[56] References Cited

U.S. PATENT DOCUMENTS

| | | | |
|---|---|---|---|
| 3,088,532 | 5/1963 | Kellner | 175/99 |
| 3,131,769 | 5/1964 | De Rochemont | 166/212 |
| 3,225,843 | 12/1965 | Ortloff et al. | 175/99 X |
| 3,405,771 | 10/1968 | Carr et al. | 175/73 |
| 4,286,676 | 9/1981 | Nguyen et al. | 175/74 |
| 5,133,404 | 7/1992 | Dollison | 166/72 |
| 5,156,223 | 10/1992 | Hipp | 175/322 X |
| 5,186,264 | 2/1993 | du Chaffant | 175/99 X |
| 5,215,151 | 6/1993 | Smith et al. | 175/45 |

Primary Examiner—Hoang C. Dang
Attorney, Agent, or Firm—Fulbright & Jaworski

[57] ABSTRACT

An orientation mandrel rotatable in an orientation body for providing rotational orientation and actuated by a hydraulic piston controlling the position of a helix. A thruster may be connected to the orientation mandrel and is adapted to hydraulically engage the well bore by plurality of elongate gripping bars. An annular thruster piston is hydraulically and longitudinally movable in the thruster body for extending the thruster mandrel outwardly from the thruster body. However, the orientating tool and thruster may be used separately.

13 Claims, 10 Drawing Sheets

WELL ORIENTING TOOL AND/OR THRUSTER

BACKGROUND OF THE INVENTION

The present invention is directed to a hydraulically actuated orientating tool and a hydraulically actuated load thruster for use in a well.

Conventional wells are normally drilled with rotary rigs that turn drill pipe with a drill bit attached to the bottom. In drilling directional wells a bottom hole assembly consisting of a bent sub, a steering motor, and a bit is connected to the bottom of the drill string. However, it is desirable to drill with coiled tubing as coiled tubing is merely unreeled from a coiled tubing reel into a well bore and does not require the time and expense of using an oil and gas rig. However, coiled tubing lacks rigidity both rotationally and longitudinally.

In particular, the present invention is directed to an orientation tool for use among other things, in a coiled tubing for orientating a steering tool to the proper direction and also the provision of a thruster to enable a drill bit to be pressed against and more readily penetrate a well bore. Thus, the combination of the orienting tool and a load thruster is provided which has particular utility in a coiled tubing to orient and direct a bottom hole assembly for drilling directional or non-vertical wells by the use of coiled tubing.

SUMMARY

One feature of the present invention is the provision of a load thruster for applying a vertical thrust in a well bore which includes an elongate body, a plurality of elongate well hydraulic piston gripping bars longitudinally aligned and positioned around the outer periphery of the body. A plurality of longitudinally spaced retainers are connected to each of the bars and directed radially for radially extending and retracting the gripping bars. A mandrel slidably and telescopically extends out of the lower end of the body and an annular piston is connected to the mandrel and is longitudinally movable in the body. A hydraulic control line longitudinally extends in the body and is connected to the plurality of hydraulic pistons for extending the piston grippers bars into contact with the well bore and the hydraulic line is connected to one side of the annular piston for extending the mandrel outwardly from the body for applying a vertical thrust. The mandrel includes a longitudinal fluid bore therethrough and the fluid bore is in communication with the second side of the annular piston for assisting in the retraction of the piston and mandrel. In the preferred embodiment, the mandrel is non-rotatable relative to the body and the mandrel includes a well tool connection at the lower end of the mandrel.

Still a further object of the present invention is a provision of an electrical line extending longitudinally through the body and through the mandrel for conducting electrical signals and the electrical line includes a coiled expansion and contraction section. Preferably the coiled section is mounted on a wind-up spring and the electrical line includes a rotatable electrical contact.

Still a further object of the present invention is the provision of thruster which includes a spring loaded valve connected to the hydraulic control line and between the first side of the annular piston and the outside of the body wherein the valve dumps the fluid pressure on the first side of the piston to the outside of the body upon a predetermined pressure in the control line for allowing retraction of the mandrel into the body.

Yet a further object of the present invention is the provision of a well orientation tool for rotationally orienting a well tool in a well bore. The orientation tool includes an elongate body and a mandrel rotatable in the body and extending out of the body for providing rotation to a well tool. A hydraulic is slidably positioned between the body and the mandrel for longitudinal movement and an enclosed helical groove and a pin, one of which is connected to the mandrel and the other which is connected to the piston provides rotation of the mandrel in response to longitudinal movement of the piston. A hydraulic control line longitudinally extends in the body and is connected to one side of the hydraulic piston for rotating the mandrel.

A still further object of the present invention is wherein the helical groove in the orientation tool extends 360° and includes first and second ends and includes a straight slot structure extending between the first and second ends for resetting the piston. In addition, a spring loaded button may be provided in the top of the straight slot allowing the pin to move out of the straight slot but not back into the top of the straight slot.

Still a further object of the present invention is the provision of a rachet wheel connected to the mandrel and a spring loaded rachet stop connected to the body for holding the mandrel in a plurality of rotational increments.

A still further object of the present invention is wherein the mandrel includes a longitudinal fluid bore extending therethrough and the fluid bore is in communication with the second side of the piston for providing a force for assisting in the retraction of the piston.

A further object of the present invention is wherein the orientation tool includes a return spring in the body acting against the second side of the piston and a spring loaded valve connected to the hydraulic line and between the first side of the piston and the outside of the body whereby the valve dumps the fluid pressure on the first side of the piston to the outside of the body upon a pre-determined pressure in the control line for retracting the piston.

A still further object of the present invention is the provision of a combination orientation tool and drill bit load thruster for use in a coiled tubing in a well bore which includes an elongate orientation body having an orientation mandrel rotatable in the body and extending out of the lower end of the body for providing rotational orientation. An orientation hydraulic piston is slidably positioned in the body and actuates a helical groove and pin for rotating the mandrel. A elongate thruster body is connected to the orientation mandrel and includes a plurality of well hydraulic piston gripping bars around its periphery and a plurality of longitudinally spaced retainers for supporting each of the grippers bars. A thrust mandrel is slidably and telescopically extending out of the lower end of the thruster body and is actuated by an annular thruster piston connected to the thruster mandrel and longitudinally movable in the thruster body. An orientation hydraulic control line longitudinally extends in the orientation body and is connected to one side of the orientation piston for rotationally orienting the orientation mandrel. A thruster hydraulic control line longitudinally extends through the orientation body and in the thruster body and is connected to the plurality of gripper pistons and to the annular thruster piston. A control valve is provided upstream of the orientation control line and the thruster control line and is adapted to be connected to a hydraulic line to the well surface and the control valve is controllable from the well surface to direct control fluid to either the orientation control line or to the thruster control line.

Other and further objects, features and advantages will be apparent from the following description of presently preferred embodiments of the invention, given for the purpose of disclosure, and taken in conjunction with the accompanying drawings.

DESCRIPTION OF THE PREFERRED EMBODIMENT

While the present orientation tool and well thruster will be described in combination for use in drilling a deviated well bore with a coiled tubing, for purposes of illustration only, both the orientation tool and the well thruster are useful independently from each other and have other applications.

Referring now to the drawings, and particularly to FIGS. 1A-1K the reference numeral 10 generally indicates the combination of an orientation tool 12 (FIGS. 1A-1F) and a well thruster (FIGS. 1F-1K) which are particularly useful for attachment to a coiled tubing (not shown) for drilling a deviated well bore and even a horizontal well bore.

The orientation tool 12 includes an elongate orientation body 16 and an orientation mandrel 18 rotatable in the body and extending out of the bottom of the body 16 for providing rotation to a well tool such as the well thruster 14 for orientating a conventional bottom hole assembly (not shown) which is attached to the lower end of the well thruster 14 and conventionally includes a bent sub, a fluid motor such as a mud or an air motor and a drill bit.

Figure 1A:
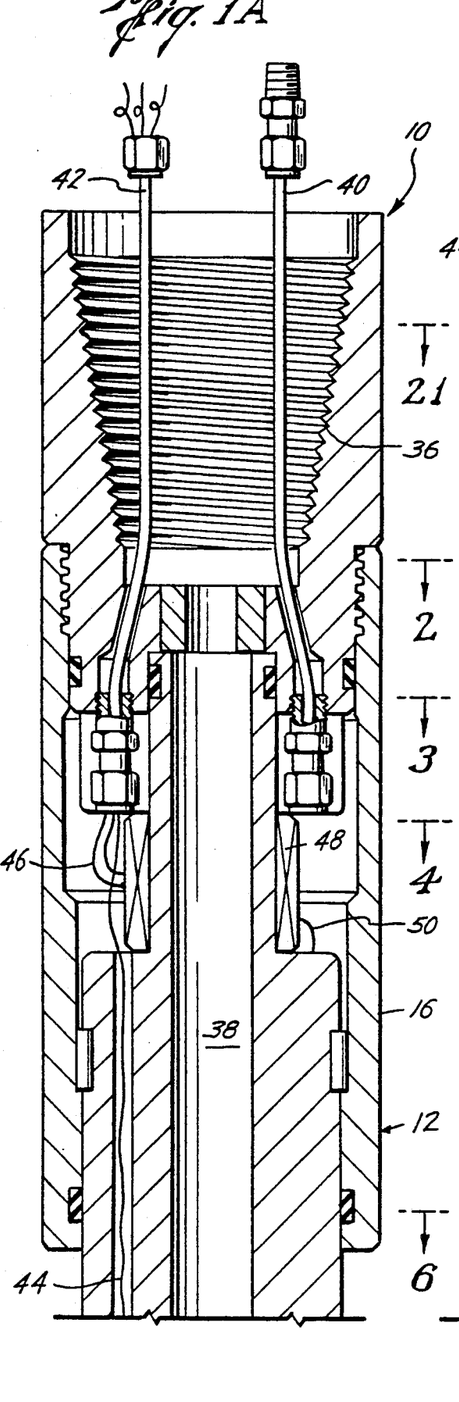
FIGS. 1A, 1B, 1C, 1D, 1E, 1F, 1G, 1H, 1I, 1J, and 1K, are continuations of each other and form an elevational view, partly in section, illustrating a combination orientation tool and thruster.
Figure 1B:
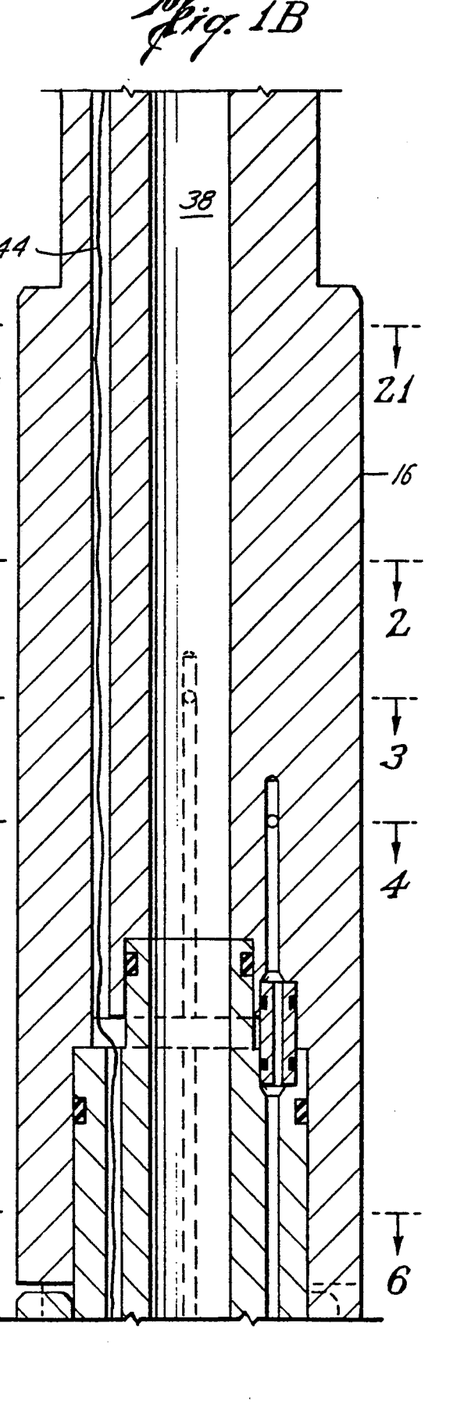
Figure 1C:
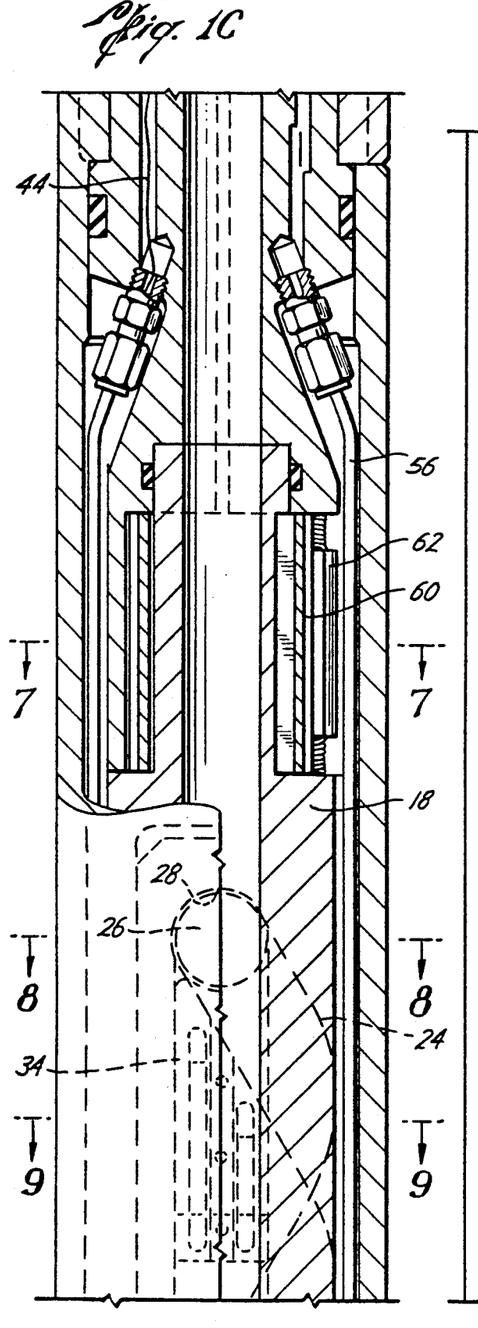
Figure 1D:
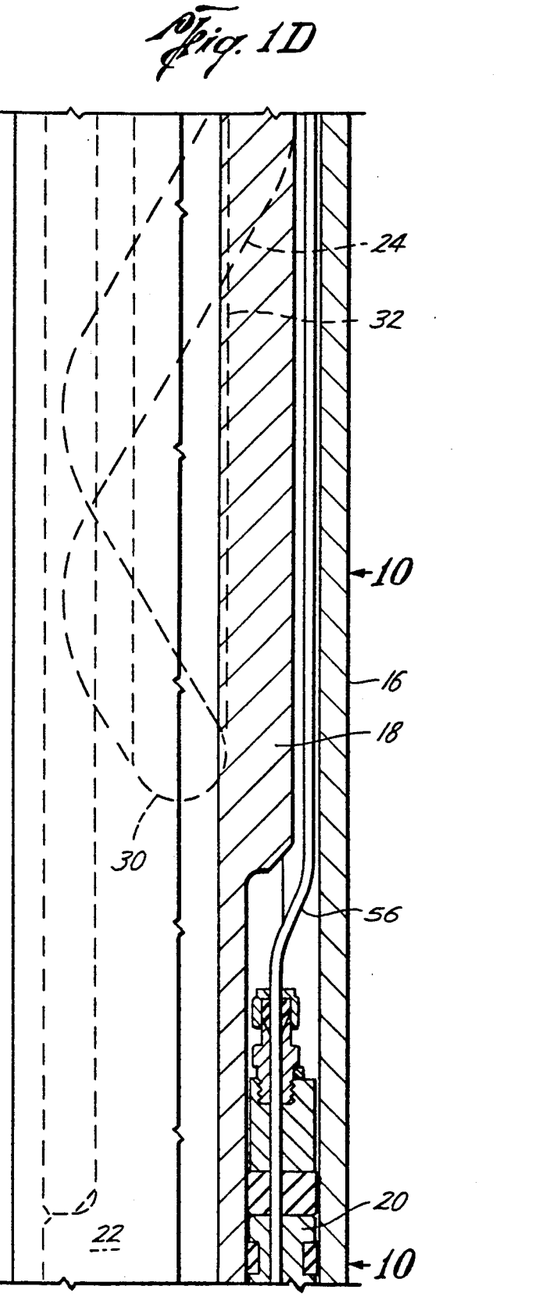

Referring now to FIG. 1D, an annular hydraulic piston 20 is slidably positioned between the body 16 and the mandrel 18 for longitudinal movement therein. The piston 20 includes a piston tail 22 which longitudinally moves with the piston 20. An enclosed helical groove 24 and a pin 26, one of which is connected to the orientation mandrel 18 and the other which is connected to the piston tail 22, here shown as the pin 26 being connected to the piston tail 22 whereby longitudinal movement of the piston 20 rotates the mandrel 18. Preferably the helical groove 24 extends 360° and includes a first end 28 and a second end 30. A straight slot 32 extends between the second end 30 and the first end 28 for allowing the pin 26 and the piston 20 to be reset after a 360° rotation so as to provide further rotational orientation. That is, after the mandrel has been rotated once 360° it is reset for additional rotation. At the top of the straight slot 32 a barrier button 34 which is spring loaded is provided so as to allow the pin 26 to move up the straight slot 32 and back into the helical groove 24, but prevents the entry of the pin 26 into the top of the straight slot 32.

Figure 7:
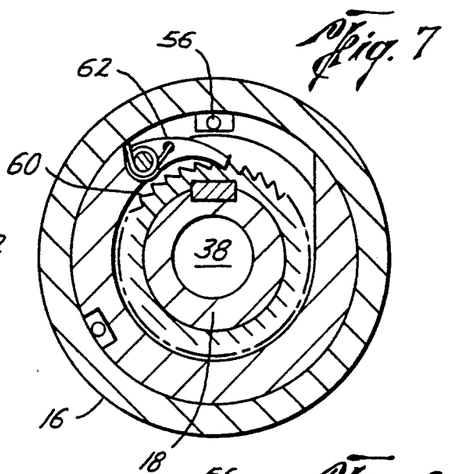
FIG. 7 is a cross-sectional view taken along the line 7—7 of FIG. 1C.
Figure 8:
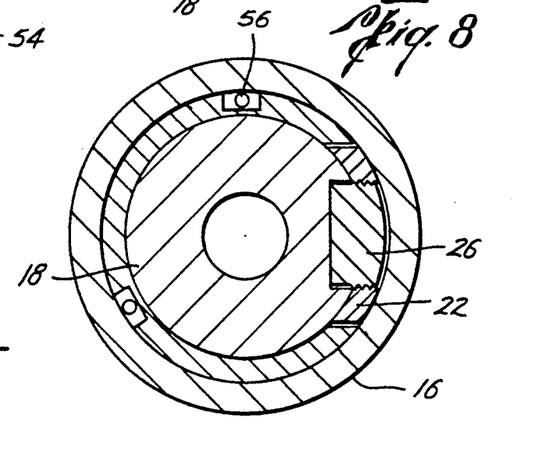
FIG. 8 is a cross-sectional view taken along the line 8—8 of FIG. 1C.
Figures 9, 12:
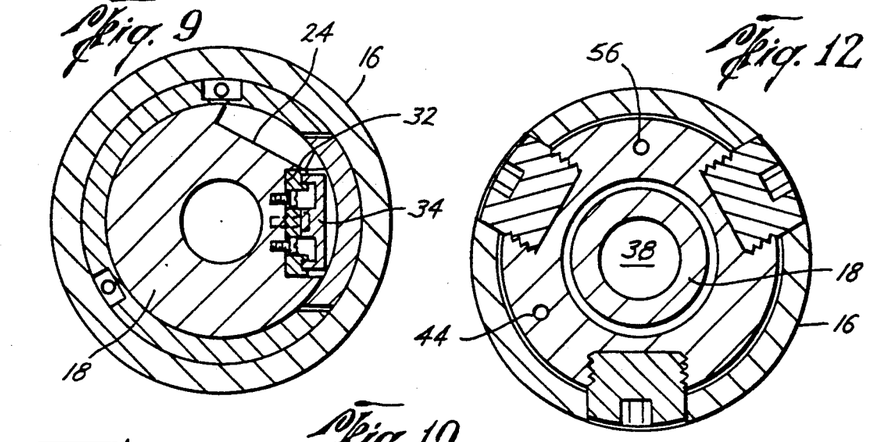
FIG. 9 is a cross-sectional view taken along the line 9—9 of FIG. 1C.
FIG. 12 is a view taken along the line 12—12 of FIG. 1F.

Referring now to FIGS. 1C and 7, a rachet 60 is provided keyed to the mandrel 18 and therefore rotates as the mandrel 18 is rotated. In the embodiment shown, the rachet 60 has 36 teeth which provides for a 10° rachet movement although any desired rotational amount may be provided. Thus, as the piston 20 is actuated the rachet wheel 60 moves past a spring loaded rachet stop 62.

Figures 1E, 1F:
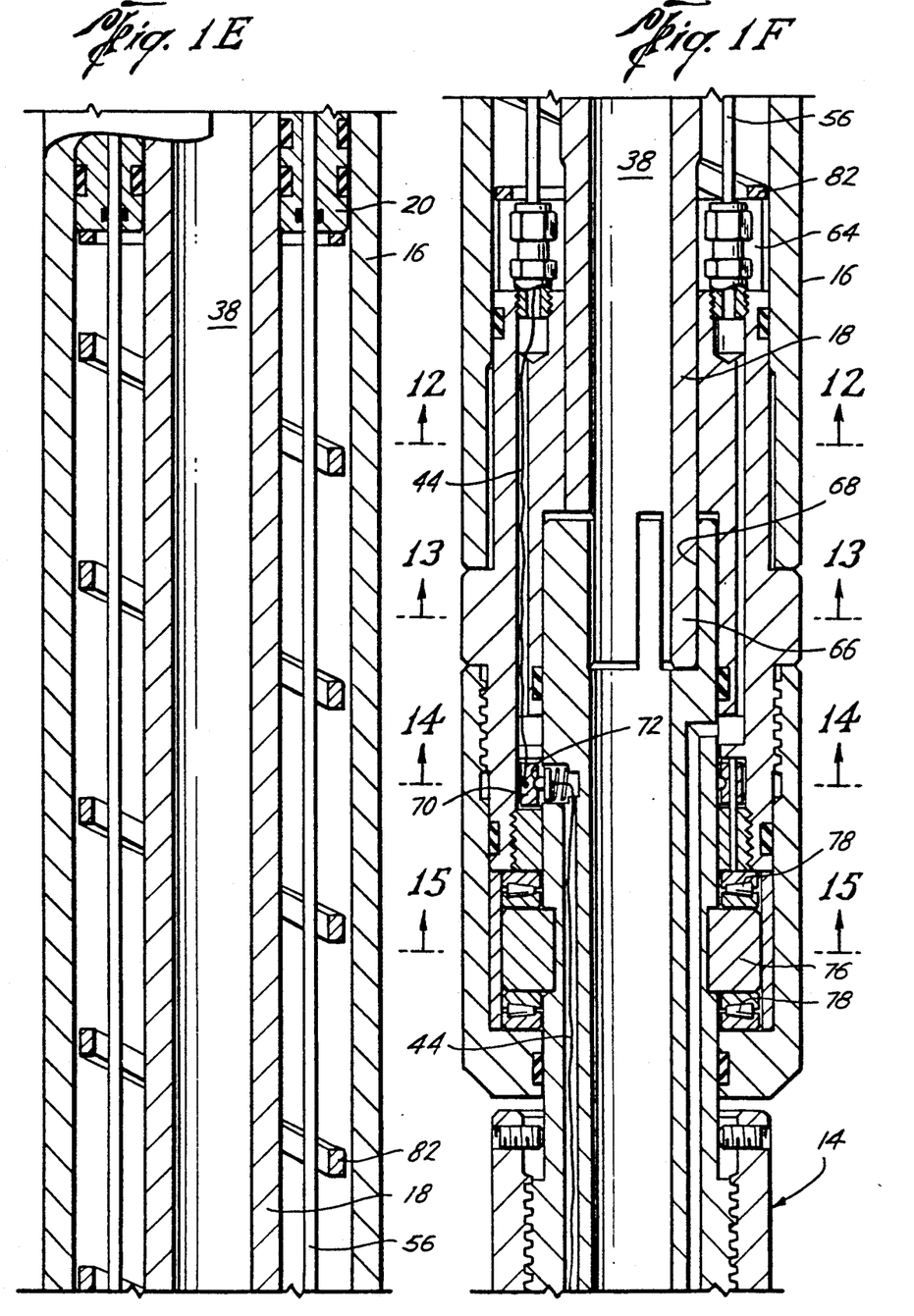

Referring now to FIGS. 1E and 1F, a return spring 82 is provided in the body 16 acting against the bottom end of the piston 20. The return spring acts against the underside or second side of the piston 20 to retract to its original position for resetting the piston after the hydraulic fluid has been shut off from the top or first side of the piston 20. In addition, well fluids in the bore 38 also act against the second side of the piston 20 assisting in resetting the piston 20.

Figure 5:
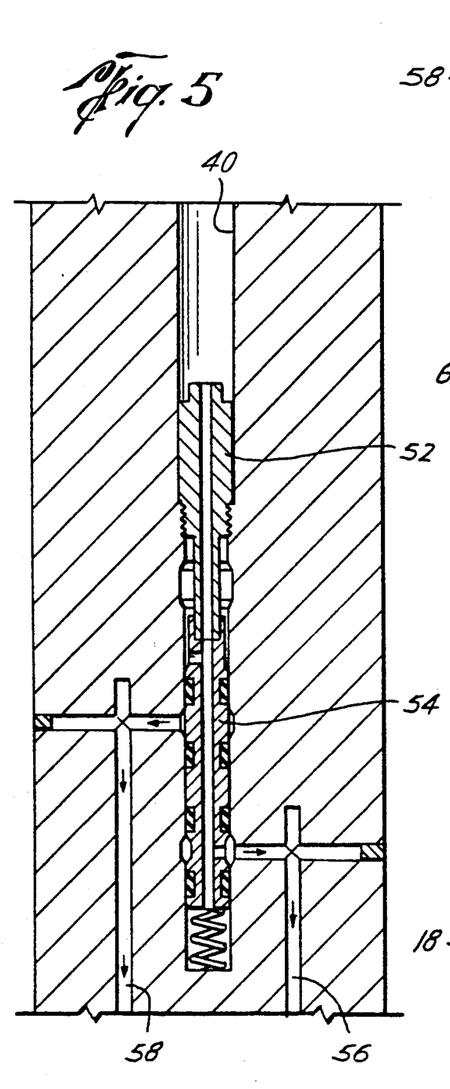
FIG. 5 is a view taken along the line 5—5 of FIG. 2.
Figure 6:
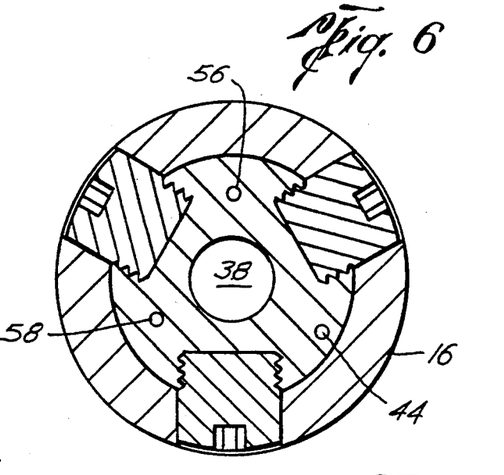
FIG. 6 is a cross-sectional view taken along the line 6—6 of FIG. 1B.

Referring now to FIG. 1A, the top of the orientation body 16 is best seen which may include a connection 36 for conventional attachment to the lower end of a conventional coiled tubing. In addition, the body 16 includes a fluid bore 38 therethrough for the receipt of drilling fluid such as conventional drilling muds or air, depending upon the type of drill motor being used. In addition, a hydraulic control line 40 and an electrical cable 42 is supplied, such as through the interior of the coiled tubing. The hydraulic control line 40 provides the hydraulic control fluid for operating both the orientation tool 12 and the well thruster 14. The electrical cable 42 includes one or more electrical lines, one of which, line 44, extends through the orientation tool 12 and through the well thruster 14 to various electrical components, such as the steering tool to provide information to the surface. Also one of the electrical lines 46 may be connected to a load cell 48 that provided a signal to the well surface to monitor coiled tubing buckling in the event that the well thruster 14 is not anchored properly with force supplied to the drill bit. Another of the electrical lines 50 is connected to and actuates an electrical motor 52 (FIG. 5). That is, the hydraulic line 40 provides hydraulic fluid to a valve 54 to transmit the hydraulic fluid through a hydraulic line 56 to the well thruster 14 as will be more fully described hereinafter or in the alternative to a hydraulic line 58 for supplying fluid to the annular hydraulic piston 20 in the orientation tool 12.

Figure 10:
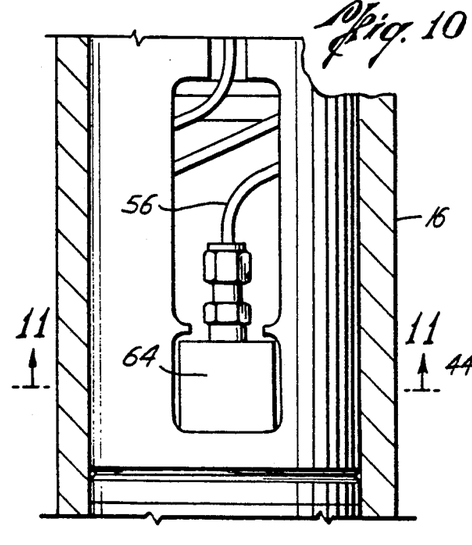
FIG. 10 is a view taken along the line 10—10 of FIG. 1D with part of the surface broken away.
Figure 11:
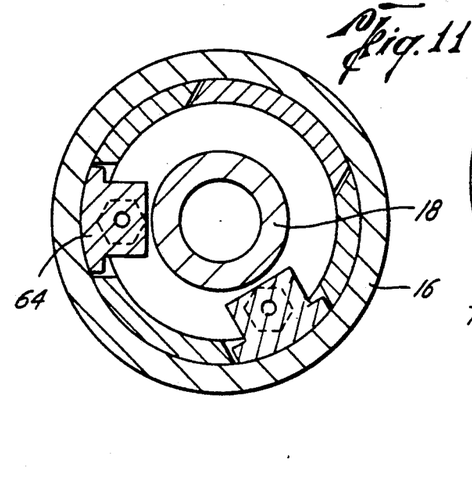
FIG. 11 is a view taken along the line 11—11 of FIG. 10.
Figure 13:
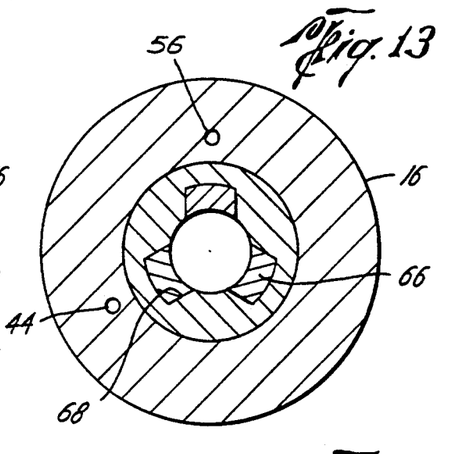
FIG. 13 is a view taken along the line 13—13 of FIG. 1F.
Figure 14:
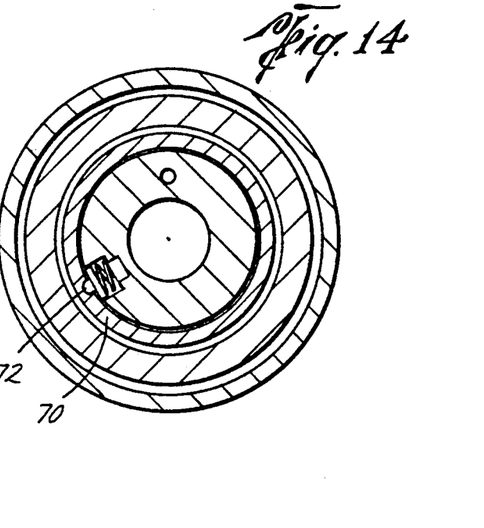
FIG. 14 is a view taken along the line 14—14 of FIG. 1F.
Figure 15:
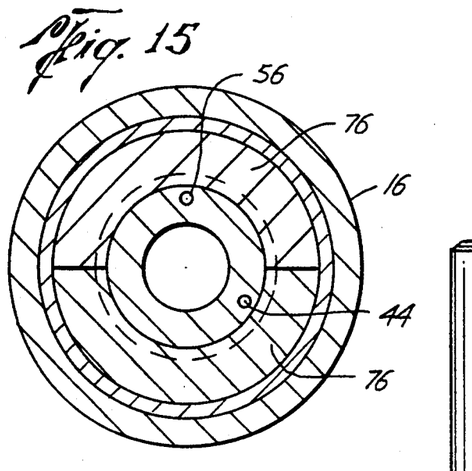
FIG. 15 is a cross-sectional view taken along the line 15—15 of FIG. 1F.

Referring now to FIGS. 1D, 1E, and 10, it is noted that the piston 20 reciprocates longitudinally up and down the hydraulic control line 56. Therefore, as best seen in FIG. 10, a rigid connection 64 is provided in the body 16 and in FIG. 1F at spaced points of the hydraulic line 56 to hold it in tension as the piston 20 moves. Referring to FIGS. 1F and 13, the key and spline connection 66 and 68, respectively, is shown between the orientation tool 12 and the well thruster 14. Also shown in FIGS. 1F and 14 is the rotating electrical contact in the electrical line 44 which is provided as the orientation body 16 rotates. That is, the electrical line 46 includes a 360° ring 70 and a spring loaded contact 72 bearing against the ring 70. FIG. 1F and FIG. 15 shows a split body 76 between thrust bearings 78.

Figure 16:
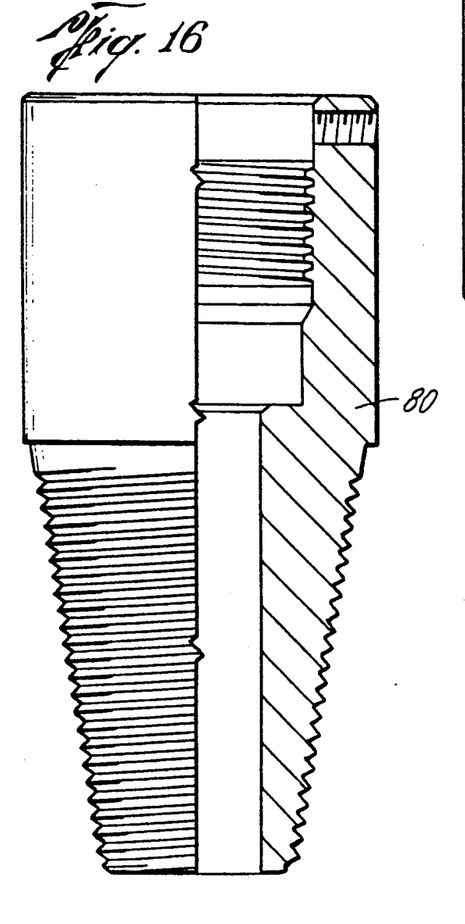
FIG. 16 is an elevational view, in quarter section, of an adaptor adapted to be connected to the lower end of the orienting orientation sleeve if it is used in other applications.

While the orientation tool 12 is described in the present application as being connected to the well thruster 14, as previously described, the orientation tool 12 may be used separately and in such an event a sub 80 (FIG. 16) would be connected to the bottom of the orientation tool 12 instead of the thruster 14.

Figure 17:
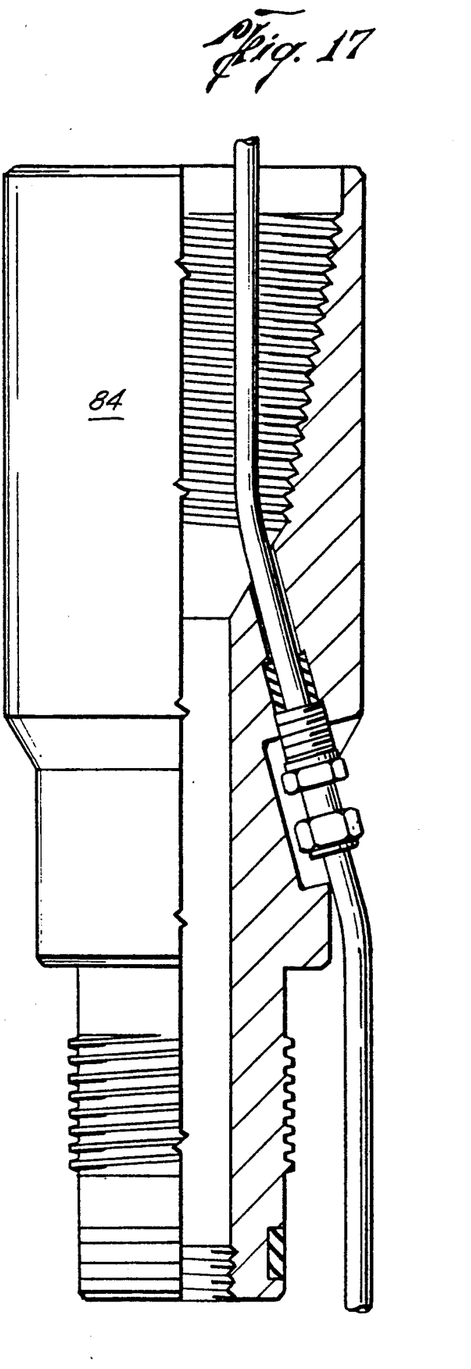
FIG. 17 is an elevational view, in quarter section, of an adaptor to be connected to the top of the thruster if it is used in other applications.

And referring to FIG. 17, a sub 84 may be provided connected to the well thruster 14 in the event that the orientation tool 12 is not used as the well thruster 14 may also be used by itself.

Referring now to FIGS. 1G-1K, the structure of the well thruster 14 is best seen. The thruster 14 includes a body 90 and receives hydraulic control fluid through line 54 from the orientation tool 12 and also receives the electrical wire line 44 which is protected in a metal tube 92. The lower end of the body 90 includes a connection such as threads 94 for supporting a conventional bottom hole assembly such as a bent sub, motor and bit (not shown).

Figure 1G:
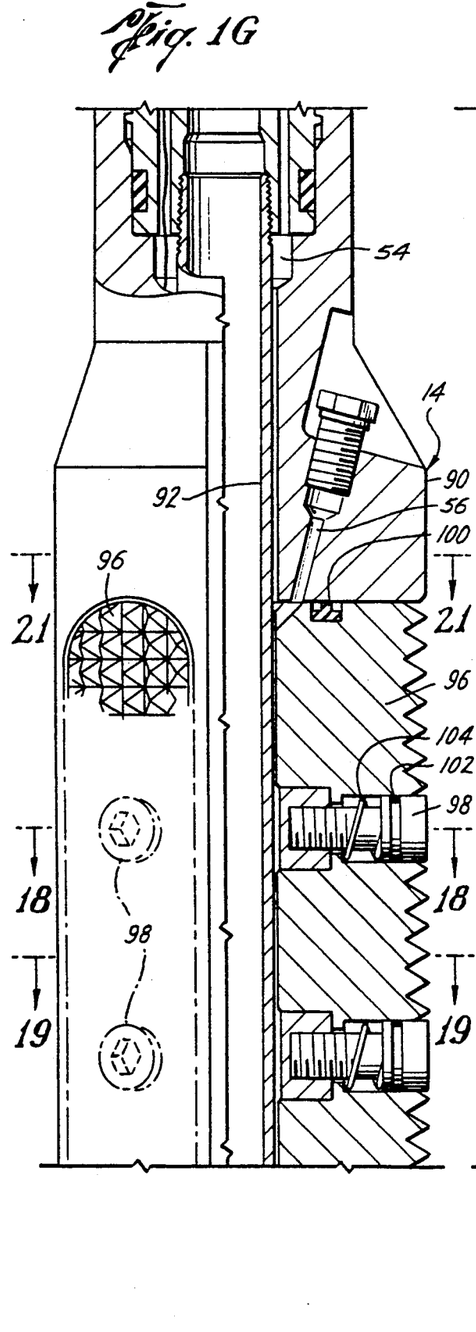
Figure 1H:
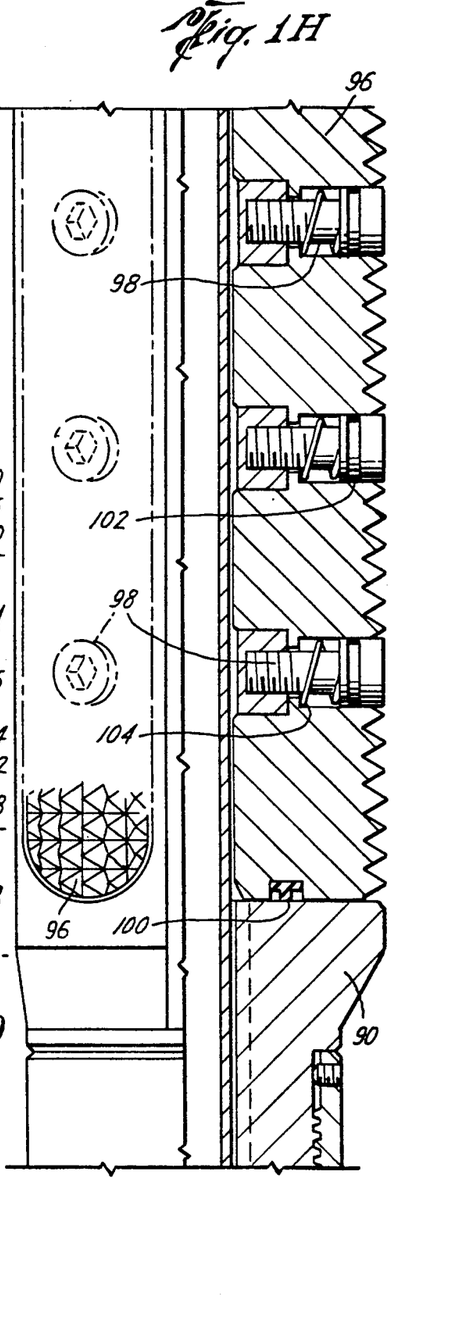

As best in FIGS. 1G and 1H a plurality of elongate well hydraulic piston gripping bars 96 provided with teeth and are longitudinally aligned and positioned around the outer periphery of the body 90. In the preferred embodiment three bars spaced at 120° is provided. However, the bars 96 must be capable of biting into the interior surface of a well bore and supporting the well thruster 14 for high loads such as 25,000 lbs. of thrust with a 3 ft. stroke. Thus, when hydraulic fluid is applied to the back of the piston bars 96 they will extend radially outwardly gripping the inside of the well bore. However, because of the elongate shape and length of the piston bars 96 they may in some cases contact an open hole in the well bore. Therefore, a plurality of longitudinally spaced retainers 98 are connected to each of the bars 96 for providing support and protecting them against uneven loads. The bars 96 include piston seals 100 at each end and seals 102 are provided between the retainers 98 and the bars 96. Preferably a spring 104 is provided between each retainer 98 and its connected piston bar 96 for aid in retracting the piston bars 96.

Figure 1I:
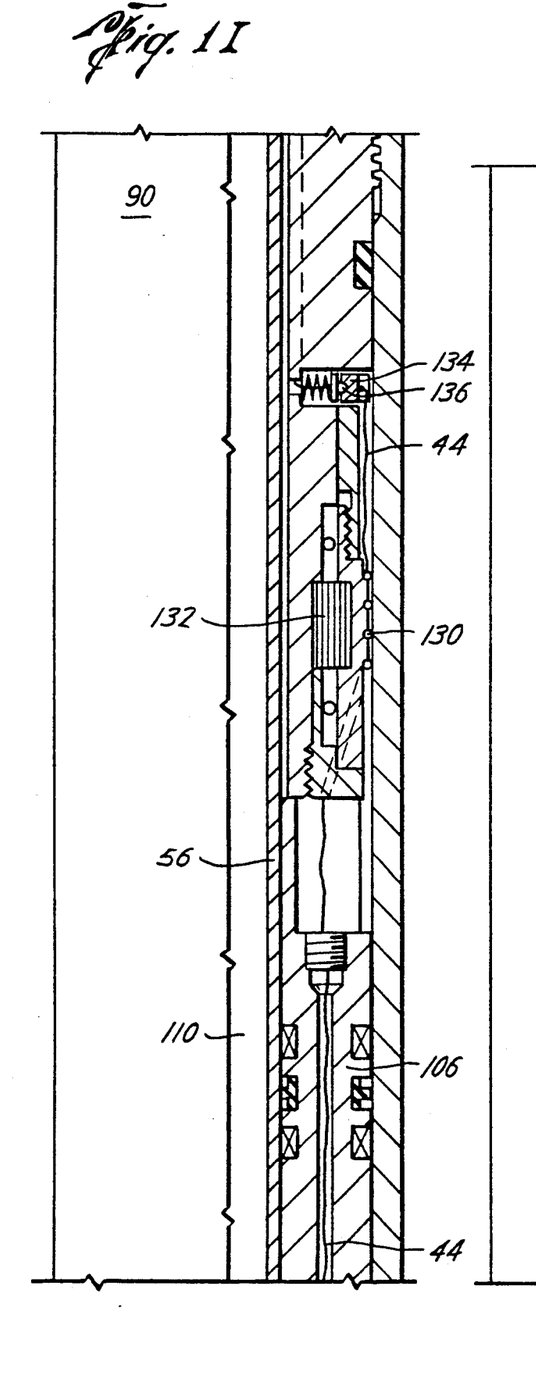
Figure 1J:
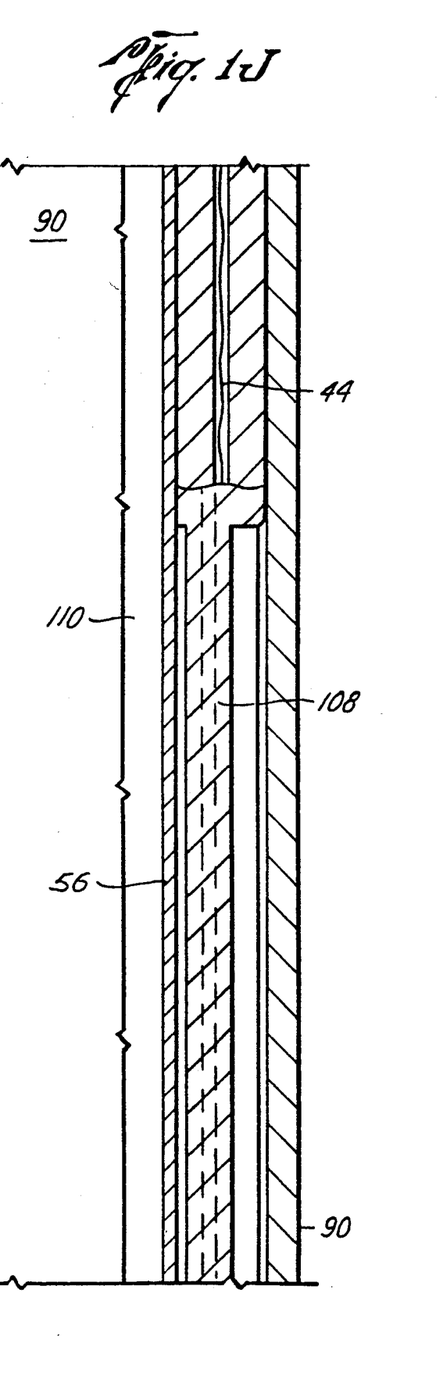
Figures 1K, 2, 3, 4:
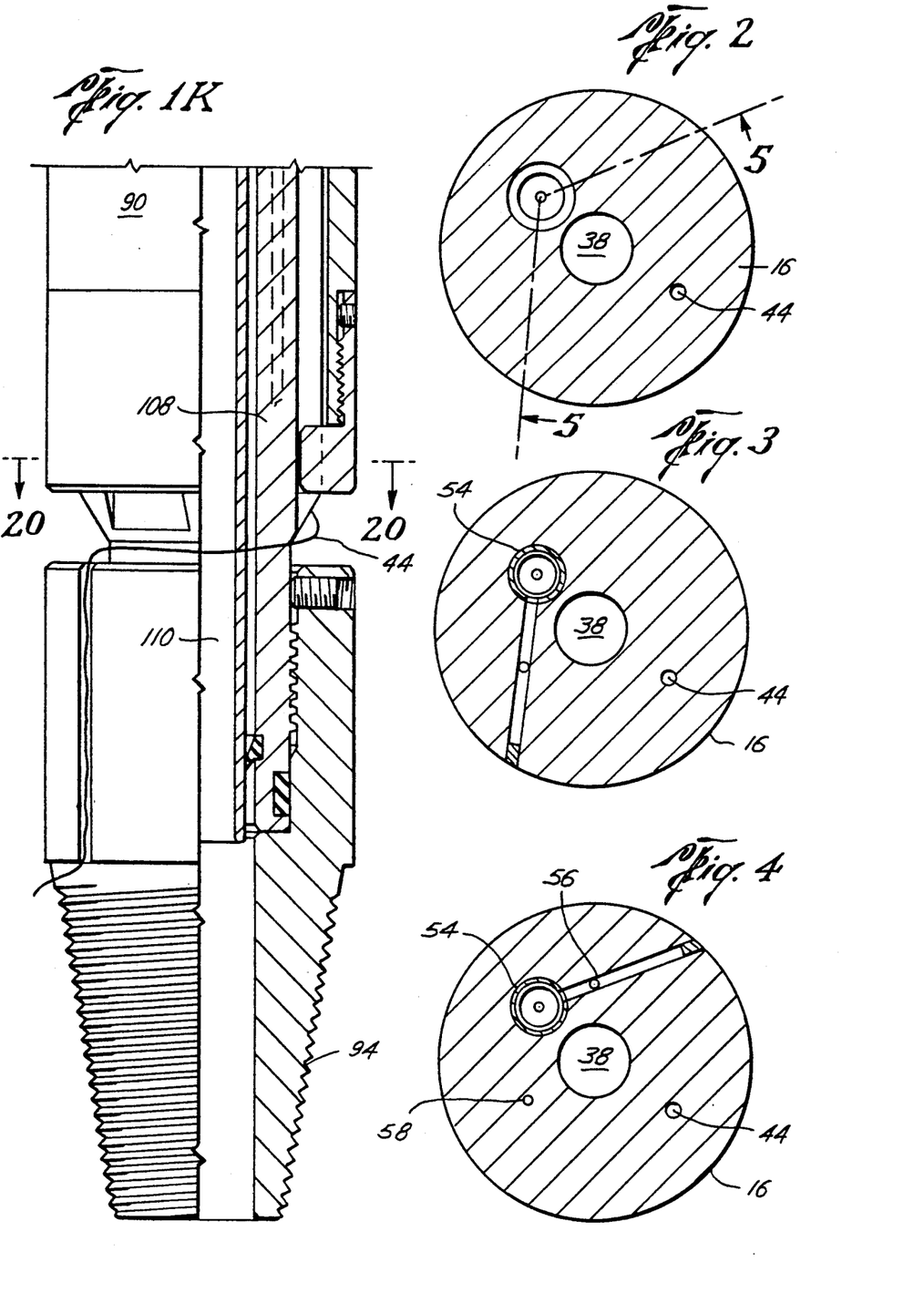
FIG. 2 is a cross-sectional view taken along the line 2—2 of FIG. 1B.
FIG. 3 is a cross-sectional view taken along the view 3—3 of FIG. 1B.
FIG. 4 is a cross-sectional view taken along the line 4—4 of FIG. 1B.
Figures 18, 19, 20, 21:
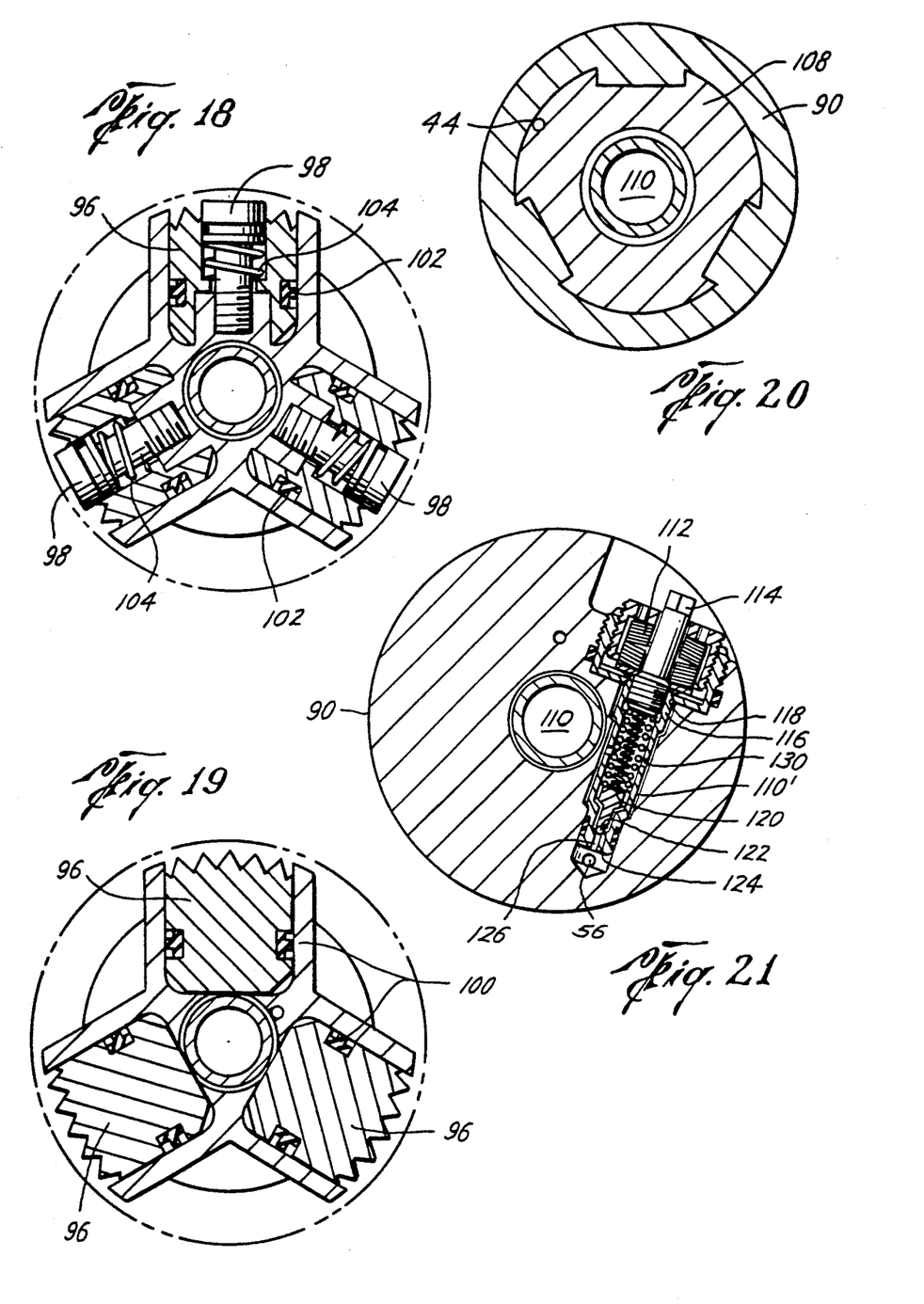
FIG. 18 is a cross-sectional view taken along the line 18—18 of FIG. 1G.
FIG. 19 is a cross-sectional view taken along the line 19—19 of FIG. 1G.
FIG. 20 is a view taken along the line 20—20 of FIG. 1K.
FIG. 21 is a cross-sectional view taken along the line 21—21 of FIGS. 1B, and 1G to denote an optional valve to be used in certain applications.

Referring now to FIG. 1I an annular thrust piston 106 is provided in the body 90 of the well thruster and is connected to a thruster mandrel 108 which is slidably and telescopically extending out of the lower end of the body 90 and connected to the connection 94. Thus, when hydraulic fluid is applied to the hydraulic control line 56 the piston bars 96 are extended outwardly to grip the well bar and the piston 106 is extended downwardly in out of the thruster body 90 to aid in moving the drill bit for providing a maximum rate of penetration. Drilling fluids such as mud or air flow from the bore 38 of the orientation tool 12 through a fluid bore 110 in the well thruster 14. As best seen in FIG. 20 the mandrel 108 is keyed to the body 90 for preventing its rotation inside of the body 90.

If the fluid being conducted down the bores 38 and 110 is a drilling liquid it will have a hydrostatic head higher than the hydrostatic head of the hydraulic control fluid. In such event, since the drilling fluid acts on the second side of the thruster piston 106, the thruster piston 106 will be retracted when the supply of hydraulic fluid to the first side of the piston 106 is shut off. However, in the event that the drilling fluid is air, which may be used in some types of production formations, the air will not have a sufficient hydrostatic head to return the thruster piston 106 upwardly and overcome the hydrostatic head of the hydraulic control fluid acting on the top side of the piston 106. In such an event the valve 110, as best seen in FIG. 21 is utilized in the cross-section 21—21 of FIG. 1G, the valve 110 is in communication with the hydraulic fluid line 56 and includes a first spring 112 pushing a stem 114 downwardly to move a valve element 116 off of a valve seat 118. The valve 110 also includes a second spring 120 acting against a ball valve element 122 moving it onto a seat 124 to close a passageway 126. When a sufficient hydraulic control fluid is present in the line 56, the ball valve 122 moves off of the seat 24 and the valve element 116 moves against the seat 118 and hydraulic control fluid flows through a line 130 to the top of the piston 106. However, when hydraulic fluid is shut off in the line 56 the springs 112 and 120 are strong enough to overcome the hydrostatic pressure in the line 56 and shut off the passageway 126 to the top of the piston 106 and also vent the top of the piston through the valve seat 118 to the outside of the body 90. Therefore, with the hydraulic fluid vented from the top of the piston 106, the coiled tubing may be lowered into the well to push the mandrel and piston 106 upwardly to reset the well thruster 14.

Similarly, the valve 110 shown in FIG. 21 may be utilized in the orientation tool 12 at line 21—21 in FIG. 1B in the event that the drilling fluid is air in order to allow resetting of the orientation tool by the return spring 82.

Referring now to FIG. 1I it is noted that when the piston 106 telescopically moves in the body 90 the electrical line 44 must also move. Therefore, the line 44 is provided with a plurality of coils 130 wrapped around a windup spring 132 which allows the electrical line 44 to be extended and retracted as the piston 106 extends and retracts. An electrical ring 134 and spring loaded contact 136 is also provided in the thruster similar to the ring and spring loaded contact 70 and 72 in the orientation tool 12.

In operation, the orienting tool 12 is normally first activated by actuating the electrical motor 52 to communicate hydraulic control fluid through the line 58 to the annular hydraulic piston 20 which moves downwardly and is attached to the rotating mandrel 18 by the guide pin 26 following in the helical groove 24. Since the mandrel 18 is keyed to the well thruster tool 14 the drill bit face is oriented in the desired direction. This directional change is conducted to the surface via the electrical line 44. After the proper direction is accomplished, the electric motor 52 is deactuated and the hydraulic control pressure is released from the line 58 and applied to the hydraulic control line 56 to the well thruster 14. This radially moves out the piston bars 96 into engagement with the well bore and activates the thrust piston 106 which provides the desired thrust force to the drill bit. After the well thruster 14 reaches the end of its stroke, the hydraulic fluid to the well thruster is released, the well thruster 14 is reset and moved downwardly and may again be actuated to provide a thrusting force. Of course, the orientation tool 14 may be actuated when desired.

The present invention, therefore, is well adapted to carry out the objects and attain the ends and advantages mentioned as well as others inherent therein. While a presently preferred embodiment of the invention has been given for the purpose of disclosure, numerous changes in the details of construction and arrangement of parts may be made without departing from the spirit of the invention and the scope of the appended claims.

What is claimed is:

1. A load thruster for applying a vertical thrust in a well bore comprising,
   an elongate body,
   a plurality of elongate well gripping bars forming hydraulic actuated pistons longitudinally aligned and positioned around the outer periphery of the body for radially extending into contact with the well bore,
   a plurality of longitudinally spaced retainers are connected to each of the bars,
   a mandrel slidably and telescopically extending out of the lower end of the body,
   an annular piston connected to the mandrel and longitudinally movable in the body,
   a separate hydraulic control line leading from the well surface and longitudinally extending in the body connected to the plurality of hydraulic pistons for extending the gripper bars into contact with the well bore and connected to one side of the annular piston for extending the mandrel outwardly from the body and applying a vertical thrust, and
   the mandrel includes a longitudinal fluid bore therethrough, said fluid bore being in communication with the second side of the annular piston.

2. The thruster of claim 1 wherein, the mandrel is non-rotatable relative to the body, and
   the mandrel includes a well tool connection at the lower end of the mandrel.

3. The thruster of claim 1 including,
   an electrical line extending longitudinally through the body, and through the mandrel,
   said electrical line includes a coiled expansion and contraction section.

4. The thruster of claim 3 wherein the coiled section is mounted on a windup spring, and the electrical line includes a rotatable electrical contact.

5. The thruster of claim 1 including,
   a spring loaded valve connected to the hydraulic control line and between the first side of said annular piston and the outside of the body, said valve dumping the fluid pressure on the first side of the piston to the outside of the body upon a predetermined pressure in the control line for allowing retraction of the mandrel.

6. The thruster of claim 1 wherein the gripping bars include a plurality of spaced pointed teeth.

7. A well orientation tool for rotational orientating a tool in a well bore comprising,
   an elongate body,
   a mandrel rotatable in the body extending out of the body for providing rotation to a well tool,
   a longitudinal fluid bore extending through the mandrel,
   a hydraulic piston slidably positioned between the body and the mandrel for longitudinal movement,
   an enclosed helical groove and a pin, one of which is connected to the mandrel and the other of which is connected to the piston whereby longitudinal movement of the piston rotates the mandrel, and
   a hydraulic control line extending from the well surface separate from the fluid bore and longitudinally extending in the body and connected to one side of the hydraulic piston for rotating the mandrel.

8. The orientation tool of claim 7 wherein the helical groove extends 360° and includes first and second ends, and including,
   a straight slot structure extending between the first and second ends for resetting the piston.

9. The orientation tool of claim 7 including,
   a spring loaded button in the top of the straight slot allowing the pin to move out of the straight slot but not back into the top of the straight slot.

10. The orientation tool of claim 7 including,
    a rachet wheel connected to the mandrel and a spring loaded rachet stop connected to the body for holding the mandrel in a plurality of rotational increments.

11. The orientation tool of claim 7 including,
    a return spring in body acting against the second side of the piston, and
    a spring loaded valve connected to the hydraulic control line and between the first side of the piston and the outside of the body, said valve dumping the fluid pressure on the first side of the piston to the outside of the body upon a predetermined pressure in the control line for retracting the piston.

12. The orientation tool of claim 7 wherein the hydraulic control line extends through the hydraulic piston which is slidably movable on the control line.

13. A combination orientation tool and drill bit load thrust for use in drilling in a coiled tubing a well bore comprising,
    an elongate orientation body,
    an orientation mandrel rotatable in the orientation body and extending out of the lower end of the body for providing rotational orientation,
    an orientation hydraulic piston slidably positioned between the orientation body and the orientation mandrel for longitudinal movement,
    an enclosed helical groove and a pin, one of which is connected to the orientation mandrel and the other of which is connected to the orientation piston whereby longitudinal movement of the orientation piston rotates the orientation mandrel, an orientation hydraulic control line longitudinally extending in the orientation body and connected to one side of the orientation piston for rotational orientating the orientation mandrel, a longitudinal fluid bore extending through the orientation mandrel, a thruster hydraulic control line longitudinally extending through the orientation body, a control valve upstream of the orientation control line and the thruster control line adapted to be connected to a hydraulic line to the well surface, said control valve controllable from the well surface to direct control fluid to either the orientation control line or to the thruster control line, an elongate thruster body connected to the orientation mandrel, a plurality of elongate well gripping bars forming hydraulic actuated pistons of longitudinally aligned and positioned around the outer periphery of the thruster body, a plurality longitudinally spaced retainers connected to each of the bars, a thruster mandrel slidably and telescopically extending out of the lower end of the thruster body, an annular thruster piston connected to the thruster mandrel and longitudinally movable in the thruster body, the thruster hydraulic control line extending longitudinally in the thruster body and connected to the plurality of hydraulic pistons for extending the gripper bars and connected to one side of the annular thruster piston for extending the thruster mandrel outwardly from the body, said thruster mandrel having a longitudinal fluid bore therethrough in communication with the fluid bore in the orientation mandrel.

* * * * *

UNITED STATES PATENT AND TRADEMARK OFFICE
CERTIFICATE OF CORRECTION

PATENT NO.   : 5,316,094

DATED        : May 31, 1994

INVENTOR(S)  : Ronald E. Pringle

It is certified that error appears in the above-identified patent and that said Letters Patent is hereby corrected as shown below:

Column 1, line 44, change "grippers" to -- gripper --

Column 2, lines 54-55, change "grippers" to -- gripper --

Column 5, line 7, change "provided" to -- provides --

Column 8, line 14, after "a" insert -- well --

Column 8, line 17, after "body" insert -- and --

Signed and Sealed this

Thirteenth Day of December, 1994

Attest:

BRUCE LEHMAN

Attesting Officer

Commissioner of Patents and Trademarks